W. L. FALLIS.
Meat-Chopper.
No. 166,865.
2 Sheets--Sheet 1.
Patented Aug. 17, 1875.
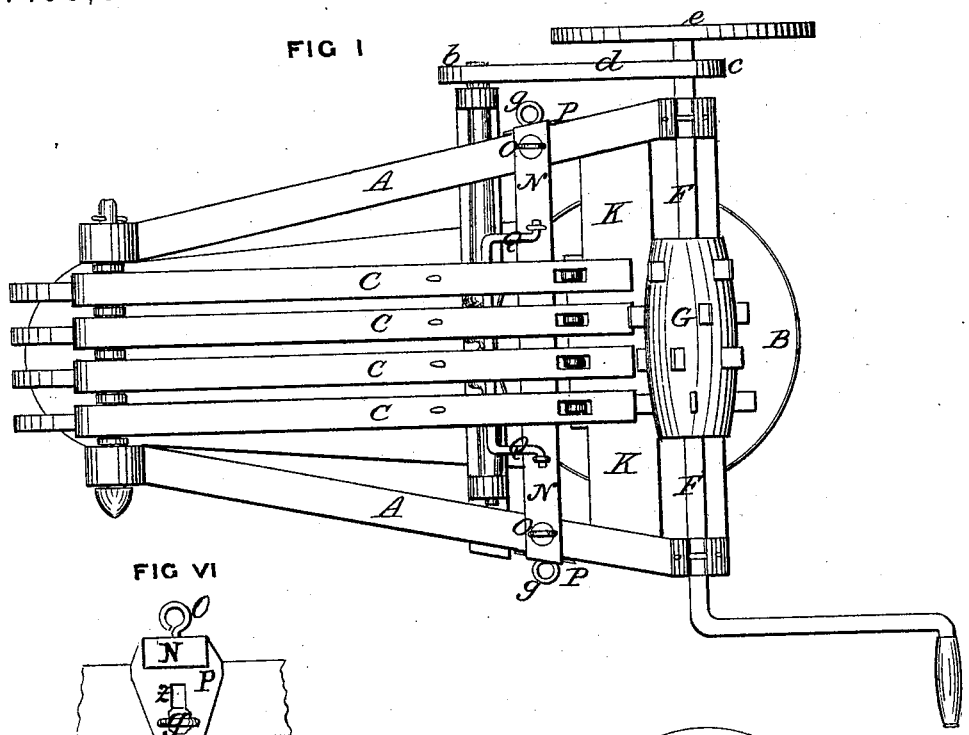
FIG I
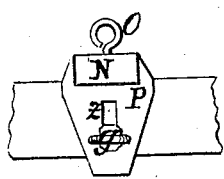
FIG VI
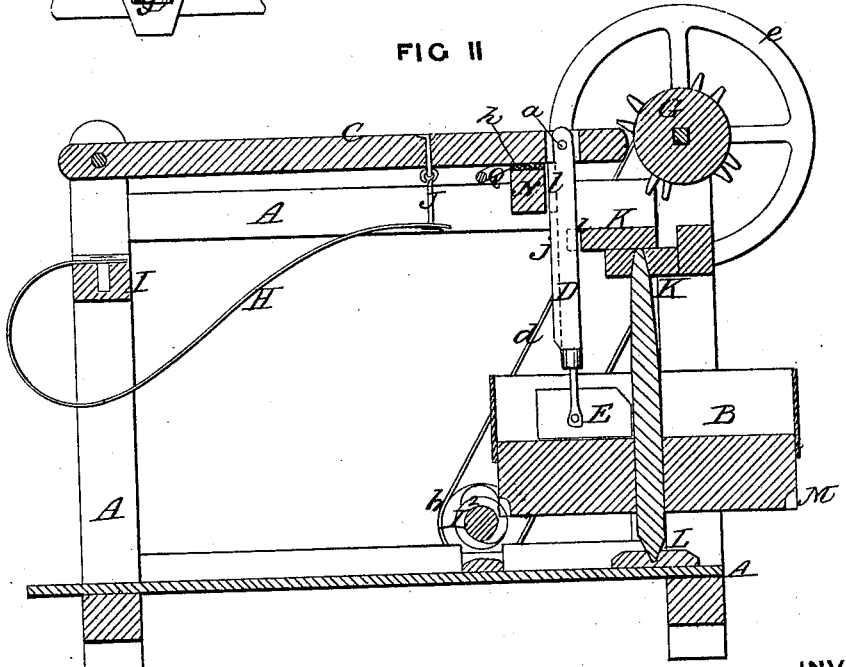
FIG II
WITNESSES
John E. Laing
J. A. Rutherford
INVENTOR
William L. Fallis,
By Johnson and Johnson,
his Attorneys.

2 Sheets--Sheet 2.
W. L. FALLIS.
Meat-Chopper.
No. 166,865. Patented Aug. 17, 1875.
FIG III
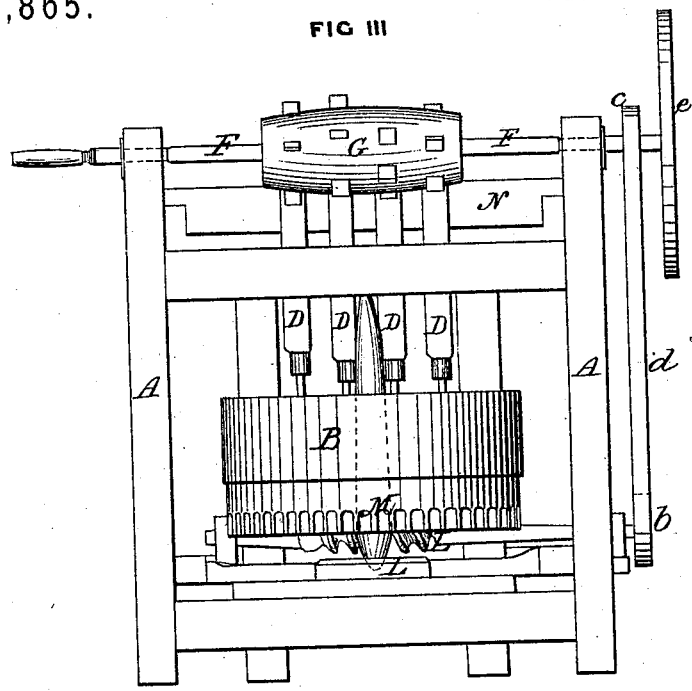
FIG IV
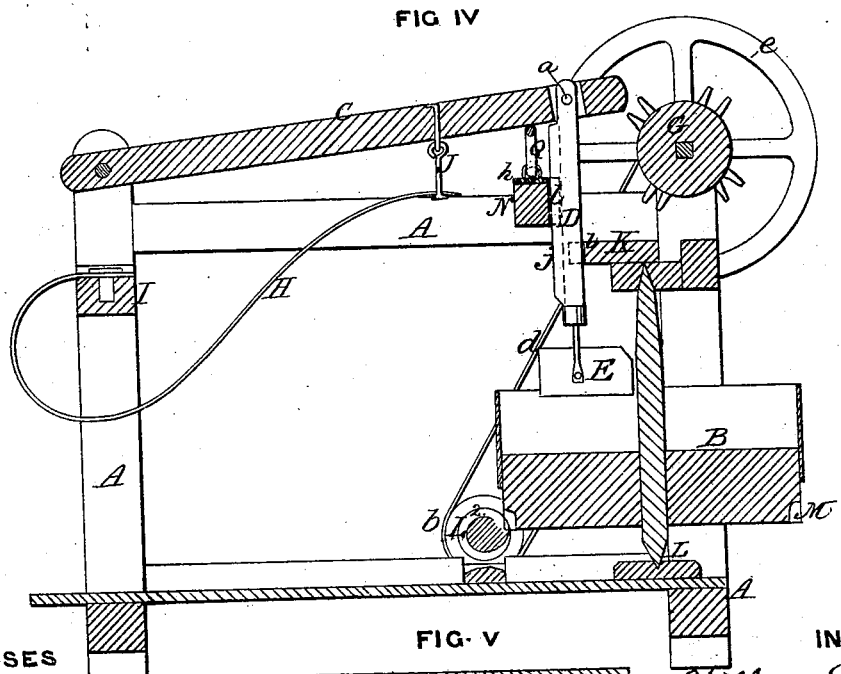
FIG. V
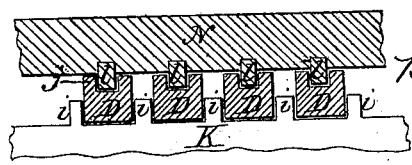
WITNESSES
John E. Laing.
J. H. Rutherford
INVENTOR
William L. Fallis,
By Johnson and Johnson,
his Attorneys.

UNITED STATES PATENT OFFICE.

WILLIAM L. FALLIS, OF WESLEY, PENNSYLVANIA.

IMPROVEMENT IN MEAT-CHOPPERS.

Specification forming part of Letters Patent No. 166,865, dated August 17, 1875; application filed June 5, 1875.

*To all whom it may concern:*

Be it known that I, WILLIAM L. FALLIS, of Wesley, in the county of Venango and State of Pennsylvania, have invented certain new and useful Improvements in Meat and Vegetable Choppers; and I do hereby declare that the following is a full, clear, and exact description thereof, which will enable others skilled in the art to which it pertains to make and use the same, reference being had to the accompanying drawing, and to the letters of reference marked thereon, which form a part of this specification.

In this meat-chopping machine the knives are carried at the free ends of arms which are pivoted to the front ends of pivoted levers, which are successively raised by a revolving toothed shaft, and the knives caused to descend upon the revolving block by the action of springs attached to the frame and the knife-carrying levers. The descent of the knives is arrested by a cross-bar, which is secured to the top of the frame by forked plates, which are also provided with slots. The bar is secured at each end between the forks of the plates, and adjusted vertically, while the slotted plates are also adjusted and clamped by screws, whereby the stop-bar is adjusted, braced, and clamped in its set position by the forked holding-plates. All the knives are raised at once from the revolving block by means of a cranked arm or lifting device, which, when turned up from its normal position, which is horizontal, raises alike all the knife-levers, and clears the tub for being emptied. The turning cranked device is arranged upon the adjustable stop-bar, and beneath the pivoted knife-carrying levers, so that the lifting device is carried beneath the levers, and by the same means which adjusts the descent thereof.

The special features of my improvement will be found specifically embraced in the claims.

In the accompanying drawings, Figure 1 represents a top view of a machine embracing my invention; Fig. 2, a vertical longitudinal section, showing the knives in operative positions; Fig. 3, a front view; Fig. 4, a section, showing the knife-carriers elevated; Fig. 5, a section, showing the guides for the knife-arms; and Fig. 6, a view of one of the slotted holding-plates for the adjustable stop-bar.

The vertical frame A, supporting the cutting mechanism and revolving block or tub B, is composed of horizontal beams and vertical corner posts. Between the upper ends of the rear posts are fitted and fulcrumed the rear ends of a series of parallel levers, C, the front ends of which carry pendent or downwardly-projecting arms or knife-bars D. The upper ends of the knife-bars are fitted into the mortised levers, and secured therein by means of pins $a$, so as to receive a slight swinging movement. The shanks of the cutters or knives E are secured to the arms D by means of ferrules, or in any preferred manner. The cutters are successively elevated by the operation of a revolving shaft, F, carrying a toothed roller, G, the teeth of which are so set that they will successively engage with the free ends of the cutter-levers, and thus raise the same. The descent of the cutters is effected so soon as the lifting-teeth are disengaged in the course of the rotation of the shaft by means of plate-springs H, bent into a bow-shape at their rear ends, and secured to the cross-bar I of the frame thereat, while their front ends are connected with hooked links J, extending down from the cutter-levers C, and engaging by T-heads with the springs. The revolving block B is fitted on a vertical shaft, which is journaled at the top in a guard-board, K, and at its lower end in a platform, L, of the frame. The block is rotated so as to continually present a fresh surface to the action of the cutters by means of a toothed rim, M, at its lower end, into which meshes a worm-shaft, $L^2$, driven by means of pulleys $b$ $c$, and a belt, $d$, from the shaft F, which also carries a fly-wheel, $e$. The descent of the cutters is limited or defined by means of a stop-bar, N, located under the pivoted cutter-levers, and capable of being adjusted in a vertical direction, so as to vary the movement of the cutters. The stop-bar is adjusted by means of temper-screws O, which pass through the ends of the same, and bear against the bottom gains cut in the top bars of the frame. Forked and slotted plates P, shown in Fig. 6, fitted to said top-bars are also provided for adjusting and supporting the stop-bar, said plates being held by means of screws $g$. The cutter-levers strike against the stop-bar as they fall, and for deadening all sound or preventing noise rubber cushions $h$ are applied to the top of the stop-bar. The vertical cutter-carrying arms are fitted between tongues or projections $i$ on the board K, and are provided with grooves $j$ in their rear edges, into which fit tongues $l$ on the adjustable bar N. The vertical movement of the cutters is thus guided, and their displacement or wrenching out of place prevented. In order to raise the cutter-levers for throwing the cutters out of action, or into such a position that the toothed roller can be revolved without operating the cutters, there is provided a cranked rod, Q, which is journaled in the stop-bar, so as to be raised for retaining the cutter-levers away from the toothed roller, and be lowered or thrown into a horizontal position, so as not to be in contact with the cutter-levers.

A meat and vegetable cutter, constructed according to the present invention, will be found to be highly effective in operation and desirable in use, thus commending itself to public favor.

The tongued guide-board K is placed in front of the adjustable cross-bar N, and at a lower level therewith, in order that the cutter-carrying arms D may be confined in their vertical movement without binding, as they would be likely to do were these guide-tongues arranged upon the same horizontal plane.

I claim—

1. The combination of the cranked rod Q with the pivoted cutter-carrying levers and frame of a meat-chopper, as and for the purpose set forth.

2. The stop-bar N for limiting the descent of the knives, provided with the slotted adjusting-plates P and the adjusting and clamp screws O $g$, whereby the stop-bar is adjusted, braced, and clamped in position, substantially as herein set forth.

In testimony that I claim the foregoing as my own I have affixed my signature in presence of two witnesses.

WILLIAM L. FALLIS.

Witnesses:
GEORGE B. FRY,
A. McDOWELL.